Patented Feb. 18, 1941

2,232,555

UNITED STATES PATENT OFFICE 2,232,555

PROCESSING CORN

Sidney Musher, New York, N. Y., assignor to Musher Foundation Incorporated, New York, N. Y., a corporation of New York No Drawing. Application October 7, 1939, Serial No. 298,426

9 Claims. (Cl. 99—36)

The present application relates to the processing of corn and particularly relates to the improvements in the steeping of whole corn prior to extraction and separation of the starch, gluten, and other materials therefrom.

In the usual processing of corn, the whole corn is steeped in water not exceeding about 110° F., for about 30 to 40 hours at an acid pH of about 3.2, the preferred acid being sulphurous acid. The steep-water which results not only is of no value or utility but presents a problem in respect to disposal since it is foul smelling and cannot readily be dumped into rivers or streams.

The steep-water which is prepared in this manner appears to contain a large amount of decomposed or putrefying proteins, the protein content being in excess of 40%, and it also appears to be devoid of water soluble carbohydrates or sugars.

It has now been found that it is possible to steep whole corn prior to the extraction and separation of the starch, gluten, etc., therefrom in such a manner as to produce products of substantial value and utility which may be utilized as or in connection with food products as, for example, antioxidants and which also may be employed as a source of various carbohydrate and organic nitrogen and phosphorous containing complexes.

It has been found that when whole corn is immersed or extracted with water having a temperature above about 120° F. and preferably below about 150° F. with a pH above 4 and below 7 and for a period of time exceeding 2 to 3 hours, but not more than about 15 to 18 hours, that most valuable extracts are obtained which may be utilized either in dilute form or in concentrated form or in paste or dried form and either as sources of water soluble carbohydrates and organic nitrogen and phosphorous complexes or directly as antioxidants for addition to or combination with glyceride oils, food compositions and other organic materials subject to oxidative deterioration.

According to the preferred procedure, the whole corn is soaked or immersed in acidified water having a pH of 4.5 to 6.9 at a temperature of 125° F. to 145° F., and preferably at about 140° F., for about 5 to 15 hours with the resultant production of an extract containing substantial quantities of water soluble carbohydrates or sugars and being low in protein content.

This composition when concentrated to 50% or 70% solids with or without absorption or concentration with carriers such as sugar, starch, salt, cereal flours, seed flours and powdered milk, may be added in small quantities, from say 0.1% to 5%, to food compositions and particularly glyceride oil containing compositions and in general to organic materials to retard oxidative deterioration thereof.

Either white or yellow whole corn may be utilized for the processing procedure.

The time of extraction may vary, but in order to obtain the maximum yield and the most desirable product, the corn should be steeped for between about 5 to 15 hours and preferably for about 10 hours.

The temperature of the water at the time of the extraction should not be in excess of about 140° F. to 145° F. in order to avoid solubilization and gelatinization of the starch, protein decomposition and other forms of conversion, which are highly undesirable in the production of the desired steep-water.

The water temperature should also not be less than about 125° F. to 130° F. in order to obtain the maximum yield of the water soluble carbohydrate containing antioxygenic substances. A difference of as little as 15° F. in the temperature of the water used for extraction may account for a 25% to 50% loss in the yield of the steep-water that is obtained and therefore the most suitable temperature of the water for extraction is about 140° F.

The water used should be substantially free of minerals and desirably free of iron and copper.

The pH of the water should be adjusted to between 4.5 and 6.9 and preferably to about 5.5 by addition of a mineral acid such as hydrochloric or sulphuric or an organic acid such as acetic, tartaric or citric. This adjustment may take place during or before the extraction.

The whole maize or corn is immersed in and desirably agitated in from 1½ to 4 parts by weight of water against the weight of the maize. As little as 1½ parts of water to every 1 part of the maize is sufficient to permit the proper extraction of the desired constituents. Where the corn is immersed in the water for in excess of 15 hours, more than 1½ parts of water to each part of corn is needed in order to be able to remove the water soluble portion after extraction and to avoid all of the extracting liquor being absorbed by the corn.

Following the extraction within the temperature and pH ranges given above, the liquor containing the water soluble portion is removed by draining, filtering or even pressing out the liquor. Desirably, steam is not injected into the corn-water mixture during the extraction in order to avoid dilution of the water containing the water soluble constituents, but the desired temperature is maintained by the use of a jacketed or steam coil containing vat.

The solution containing the corn may also be subjected to a continuous centrifuging whereby all undissolved material is removed as a continuous operation.

The substantially clear solution thus obtained should desirably be evaporated by vacuum distillation at 135° F. under 25 inches of vacuum, to approximately 25% to 75% solids and desirably to about 65% or 70% solids and to a Baumé of about 37°. After the proper solids content has been reached, the steep-water may be subjected to superheated steam in the vacuum pan in order to raise the temperature of the steep-water to about 190° F. to 200° F. for about 10 minutes in order to sterilize it and also retain its full stabilizing properties for longer periods.

The evaporating temperature may vary, dependent upon whether vacuum or atmospheric pressure is used. Although it is desirable to use vacuum evaporation, evaporation at atmospheric pressure may also be employed.

The concentrated steep-water may where desired be packed in cans or other containers and sterilized at 220° F. to 250° F. for 10 to 30 minutes.

Where, due to prolonged sterilization or high heat during such sterilization, a coagulation or precipitation is formed resulting in the production of insoluble matter, such precipitate may be filtered or otherwise removed. Distilled or softened water is desirable as the extracting medium and will avoid, to a large degree, such precipitation and coagulation.

The steep-water or extract thus obtained is generally of dark brown or tan color, substantially free of converted starch or protein and has none of the objectionable putrid characteristics of ordinary corn steep-water. Moreover, the steep-water is high in water soluble sugars and differs in appearance, constitution and chemical activity from the steep-water obtained from the usual corn starch manufacturing procedures. The steep-water is also substantially free of oil, starch and fibrous materials, is pleasant tasting and may be utilized for addition to oxidizable food compositions to retard oxidative deterioration thereof without changing their normal appearance or flavor.

The sugars contained in the steep-water appear to be necessary in producing the desired antioxygenic effect and are particularly essential when subjected to elevated temperatures in the organic composition to be preserved.

It is not desirable to concentrate the steep-water down to in excess of 70° solids in the vacuum pan, as otherwise darkening and caramelization of the steep-water occurs.

Where drying is desirable, the concentrated steep-water may be dried on trays, preferably under vacuum and a desirable dried product will be obtained. Drum drying is difficult in view of the mucilaginous nature of the steep-water by means of which the steep-water adheres to the drum and cannot readily be scraped off. Spray drying may less preferably be resorted to in view of the oxidation occurring during the spray drying operation.

The concentrated corn steep-water obtained in accordance with this invention has wide antioxygenic properties and may be satisfactorily used for the preservation of organic materials subject to oxidative deterioration, but is particularly utilized for aqueous food compositions.

For example, the steep-water may be satisfactorily used for curing operations such as a part of the curing ingredients in the curing of fishery products such as herring, mackerel, salmon, etc., and in the curing of meat products such as bacon, hams, etc. The steep-water is beneficial for retarding blood oxidation of haemoglobin to maethmoglobin wherein it may be added to sausage, hamburgers, etc. The steep-water may also be used in the dairy industry as for addition to milk, cream, ice cream, cream in the manufacture of butter, etc.; for addition to aqueous emulsions containing glycerides, essential and hydrocarbon oils subject to oxidation; in the curing of fruit products and also for canned and frozen fruits to retard oxidative deterioration and discoloration thereof; for fortifying cereals, starches and cereal grasses, and for use in the manufacture of puddings and desserts and in the quenching of coffee.

Less than 5% of the concentrated steep-water on its solids basis thus obtained will give the desired preservative effect and in most instances less than 1% of the steep-water will be sufficient. The steep-water should desirably be thoroughly dispersed throughout the body of the composition to be stabilized.

It has been particularly found that where the corn steep-water extract is added to an organic material subject to oxidation and that organic material containing the extract thoroughly dispersed therein subjected to an elevated temperature such as to in excess of 150° F. and preferably in excess of 250° F. a marked acceleration or increase in preservative effect will be obtained. For this reason, it is desirable for the steep-water to be added to the organic material, thoroughly dispersed therein and then to subject the organic material to an elevated temperature in order to more markedly develop the preservative effect.

It is not known exactly how this mechanism occurs, but it is considered that the carbohydrates present in the steep-water plan an important part in the development of the markedly accelerated and preservative action under the conditions of heat treatment.

It has been found that although the steep-water thus obtained has but little effectiveness when used with pure glyceride oils and fats such as lard, it is extremely effective when used in aqueous materials maintaining the oil globules. The presence of the steep-water in the continuous aqueous phase gives extremely marked protection to the fat phase, although when added direct to the fat phase, it is comparatively much less effective.

Even when the steep-water is added to an aqueous emulsion, and that emulsion subsequently broken as when cream is churned into butter, the protective effect originally exerted upon the emulsion, in this case the cream, is carried with the fat or oil, in this case the butter, to stabilize that fat against oxidative deterioration.

It is particularly desirable in accordance with this invention for the steep-water to be dried and absorbed upon cereal flours, seed flours, starch, sugar or salt, which appear materially to increase or enhance the antioxygenic effect and under which condition the absorbed steep-water becomes considerably more effective as an antioxidant than where used alone for the aqueous food composition.

Where the antioxygenic steep-water is dried on sugar, either raw or refined cane or beet sugar may be employed, either in crystallized or syrup form, or residues or mother liquors obtained from them. Other sugars upon which the steep-water may be dried are dextrose, lactose and fructose.

In order to obtain a thorough surfacing of the steep-water on the individual sugar crystals, the steep-water may be dried down to about 40% to 70% total solids and then thoroughly mixed with the sugar in the centrifugals and after substantially all of the mother liquor has been removed. The sugar may then where desired be subjected to an elevated temperature in order to remove the balance of the water still remaining in the steep-water. The enhanced antioxygenic sugar containing the steep-water will have valuable properties for use in aqueous food compositions and particularly where normally large quantities of sugar are utilized such as for ice cream, sherbets, candies, confections, jams and jellies and for sweetening aqueous food compositions generally, in sugar curing, for beverages and fruit concentrates and fruit juices.

Where salt is employed as the carrier, the steep-water may be applied to the salt as it leaves the kiln and while the salt is at a temperature of about 275° F., mixing thoroughly the steep-water with the salt so that while the salt is at the elevated temperature, the balance of the water remaining in the steep-water will be volatilized, or where desired, the salt may be subjected to a further vacuum evaporation after applying and thoroughly admixing the steep-water therethrough.

The steep-water may be applied to the sugar or salt in any desired amount using, for example, from 0.5% by weight against the solids weight of the steep-water as against the weight of the sugar or salt upon which the steep-water is absorbed to from, for example, 30% of the steep-water and 70% of the sugar or salt.

In any case, the resultant steep-water or the resultant steep-water absorbed upon the sugar or salt is free of corn fibres, starch, or oil and other water insoluble components of the corn.

Another carrier that may be employed to increase further the stabilizing effect is powdered skim milk. The steep-water may be mixed with the milk, preferably skimmed, in concentrated form, and using from 10% to 60% of the steep-water and 90% to 40% of the milk, based upon their solids weight, and then the ingredients dried together. The drying may be done preferably on a hot roll and the dried film scraped off after drying. Less preferably the mixture may be dried by spraying into a heated chamber.

The skim milk absorbs the gummy characteristics of the steep-water and permits much easier drying than where the steep-water is dried alone.

The water soluble extract of the corn, absorbed upon salt, sugar or skim milk solids, thus obtained is highly desirable for utilization in retarding oxidative deterioration of aqueous food compositions and particularly for oil containing food compositions where the oil occupies the discontinuous phase and water the continuous phase, and whereby even though the steep-water is mixed in the aqueous continuous phase, it nevertheless retards deterioration of the oily discontinuous phase.

Among such oil in water aqueous compositions are included particularly dairy products such as milk, cream and ice cream, and other food products such as mayonnaise, salad dressing, cod liver oil emulsions, mineral oil emulsions, etc.

There are also included the fruit juices and fruit concentrates and the cola type beverages in all of which compositions an essential oil is present as the discontinuous phase in the aqueous continuous phase.

Example I

Whole yellow corn was immersed in water having a pH of 5.5 and at a temperature of 140° F. One and three-quarter pounds of water were used to every one pound of corn. The temperature was maintained by the use of a jacketed vat and the corn was held in the water for a period of 12 hours, at the end of which time the water was drained off. This water contained approximately 21% total solids. The steep-water thus obtained was evaporated under reduced pressure at 135° F. to 60% total solids. This steep-water was then added to milk normally susceptible to the development of oxidized flavors in an amount of 0.05%, the milk containing 3.5% butterfat in globule form dispersed in the continuous aqueous phase.

The milk containing the concentrated steep-water was compared with untreated milk by allowing it to stand at 50° F. and testing at regular intervals for oxidized flavor development. The results are given below, the number of + signs indicating the degree of oxidized flavor.

| | Degree of oxidized flavor after— | |
|---|---|---|
| | 24 hours | 48 hours |
| Untreated milk | + | +++ |
| Treated milk | − | ++ |

Example II

An antioxygenic crystallized refined cane sugar was prepared by adding to the sugar 2% of the concentrated steep-water prepared as described in Example I. The sugar was then placed in a vacuum oven and dried at 150° F. This sugar was added to a buttercream candy mix and compared with a buttercream candy mix containing ordinary refined cane sugar by tasting the buttercreams thus prepared at regular intervals. The buttercreams made with the treated cane sugar carrying the steep-water showed materially less development of tallowy and rancid off-flavors over a three week period than the buttercreams prepared with the ordinary refined crystallized cane sugar, the degree of improvement indicating an approximately 50% longer shelf life for the buttercreams prepared with the treated sugar.

It is particularly surprising to find that the corn steep-water is even more effective when added to the aqueous continuous phase of a water containing oxidizable food composition to protect the discontinuous oil phase contained therein than either the original unextracted corn or the corn steep-water when added direct to the oil which is subsequently dispersed in the aqueous continuous medium.

The aqueous food compositions particularly to be stabilized in accordance with this invention contain 20% or more of water and generally as much as from 50% to 95% of water.

Among such products are included the dairy products, curing brines as used in the curing of meat products including bacon, hams and pork, poultry products, fishery products such as mackerel, sardines and salmon, fruits including olives, peaches and pears, beverages and candies or confections.

With regard to those aqueous food compositions not necessarily existing in emulsified form and for the most part fat free, such as egg albumen or egg white, and fruits, the corn steep-water may also be advantageously employed to retard protein decomposition and essential oil oxidation in them.

The antioxygenic steep-water may also be employed for addition to water that is normally used in the processing of food compositions, such as for addition to the water used in the quenching of coffee, for addition to brines that are used in brining or curing operations such as in the brining of olives, meats, fish, fruits, vegetables, for addition with water in the manufacture of sausage, for manufacture into ice or ices, and for addition to water in the manufacture of doughs for bakery products.

It has furthermore been surprisingly found that where the steep-water is subjected to an elevated temperature at the time of use in connection with the aqueous food composition requiring stabilization and in the presence of such aqueous food composition, a marked acceleration of the stabilizing process is obtained, particularly when the steep-water has been absorbed upon a carrier, such as sugar.

The steep-water in the presence of the oxidizable food composition should desirably be subjected to a temperature of 145° F. or more and most desirably of from 165° F. to 250° F. or more. For example, where the concentrated steep-water of corn thus obtained is added to cream, and that cream subjected to an elevated temperature such as to 175° F. for 5 minutes, the effectiveness of the steep-water is considerably improved over its effectiveness when added to the same cream where the cream is not heated with the steep-water. In addition, the butter made from that heat treated cream containing the extract is similarly materially improved in keeping quality.

The application of the elevated temperature should be made to the aqueous food composition after the steep-water has been added to it and thoroughly dispersed therein. It is not desirable nor can the desired effect be obtained by heating the concentrated steep-water alone and then adding such heated steep-water to the oxidizable aqueous material. When the steep-water is heated alone, no improvement is obtained over the unheated steep-water and frequently a reduction in antioxygenic activity is observed.

The steep-water thus obtained may be utilized for addition to milk, ice cream, condensed or evaporated milk, frozen cream, cream cheese or other form of dairy products, fruit juices, fruit concentrates, beverages, vegetable juices, liquid egg yolk, egg white, soups, tomato juice, tomato catsup, jams and jellies, desserts and similar products and particularly where the food composition is subsequently subjected to an elevated temperature of at least 145° F. to 250° F. or higher.

Any desired amount of the steep-water may be employed such as from 0.005% to 5% by weight of the concentrated steep-water, although desirably less than 1% is employed and will give the desired antioxygenic effect.

Modification may be made in the use of the slightly acidified water as a solvent as when minor proportions of other water soluble solvents are employed together with water in the steeping of the corn. For example, there may desirably be employed alcohol, including methyl, ethyl, butyl or propyl alcohol such as when a mixture of from 30% to 50% or more of ethyl alcohol is utilized in the water in the steeping of the corn, that mixture being preferably acidified before or during extraction as indicated above. The concentrated steep-water obtained by the use of these modified aqueous solvents has desirable characteristics and may be utilized for antioxygenic and other values.

This new process for the steeping of corn is particularly desirable where the residue, following the steeping process is subjected to the usual further steeping at a relatively low temperature and at a pH of 3.2 for a period of 30 to 40 hours and whereby a large proportion of protein materials, particularly in decomposed form, is removed from the corn. By this new steeping process, the resultant corn is freed of a large proportion of constituents which are in themselves highly desirable and valuable but which are not obtainable when the corn is subjected to the usual commercial steeping process. The ordinary steeping procedures of commerce do not permit the extraction of the ingredients removed in accordance with this invention and the steep-water that is obtained by the usual commercial procedures is sold at a nominally low cost because of the objectionable constituents and odoriferous substances which it contains, its use being limited to cattle feed and then only in a small proportion of the total feed of the animal.

Moreover, the steeping process described in accordance with this invention permits the manufacture of lower cost starch not only by reason of the increased value of the concentrated steep-water obtained in accordance with this invention but also by reason of the lesser quantity of objectionable constituents that are removed, which objectionable constituents in the form of the ordinary steep-water of commerce are responsible for serious disposal problems in the corn starch manufacturing industry.

Having described my invention, what I claim is:

1. In processing corn, the steeping of corn in an aqueous liquor having a temperature of between 120° F. and 150° F. at a pH of between 4 and 7 for about 3 to 18 hours.

2. In processing corn, the steeping of corn in an aqueous liquor having a temperature of between 125° F. and 145° F. at a pH of between 4.5 and 6.9 for about 5 to 15 hours.

3. In processing corn, the steps of steeping corn in an aqueous liquor having a temperature of between 125° F. and 145° F. at a pH of between 4.5 and 6.9 for about 5 to 15 hours and then concentrating the steep-water obtained under reduced pressure to in excess of 25% total solids.

4. A process of making a corn steepwater which is substantially devoid of decomposed proteins and which has an agreeable flavor and odor so that it may be mixed with food products, which comprises immersing whole corn in water having a pH of 5.5 at a temperature of 140° F. in the proportion of about 1¾ pounds of water for every pound of corn, continuing said treatment for a period of about 12 hours, removing the steep-water, and evaporating the steepwater at about 135° F. to 60% total solids, whereby there is produced a concentrated steepwater free of oil, starch, and fibrous materials having a pleasant taste and which may be mixed with oxidizable food compositions to retard oxidative deterioration thereof.

5. A process of making a corn steepwater substantially devoid of converted starch and substantially free of the objectionable putrid substances contained in ordinary corn steepwater, which comprises immersing whole corn in water at a temperature of 125° F. to 145° F. for a period of 5 hours to 15 hours and at a pH of 4.5 to 6.9, removing the steepwater, evaporating until such steepwater contains more than 50% solids, and then combining the concentrated steepwater with sugar and drying.

6. In processing corn, the steeping of corn in an aqueous liquor having a temperature of between 120° F. and 150° F. at a pH of between 4 and 7 for about 3 to 18 hours, from 1½ to 4 parts by weight of aqueous liquor being utilized for each part by weight of corn.

7. In processing corn, the steeping of corn in an aqueous liquor having a temperature of between 120° F. and 150° F. at a pH of between 4 and 7 for about 3 to 18 hours, said aqueous liquor consisting of a combination of water and a water miscible aliphatic alcohol.

8. In processing corn, the steeping of corn in an aqueous liquor having a temperature of between 120° F. and 150° F. at a pH of between 4 and 7 for about 3 to 18 hours, said aqueous liquor including at least 30% to 50% of a water miscible aliphatic alcohol.

9. In processing corn, the steeping of corn in an aqueous liquor having a temperature of between 120° F. and 150° F. at a pH of between 4 and 7 for about 3 to 18 hours, said aqueous liquor including at least 30% to 50% of methyl alcohol.

SIDNEY MUSHER.